June 6, 1939.   H. HENSOLDT   2,161,623
PRISM SYSTEM
Filed Aug. 25, 1937
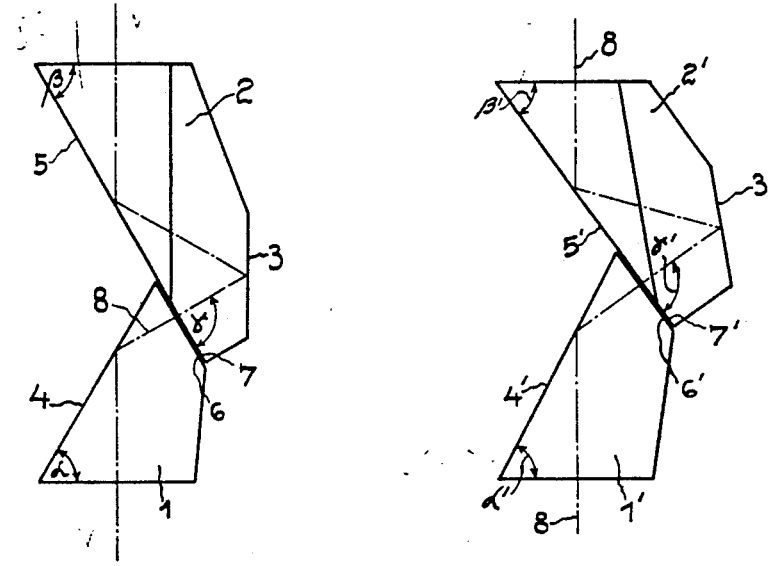
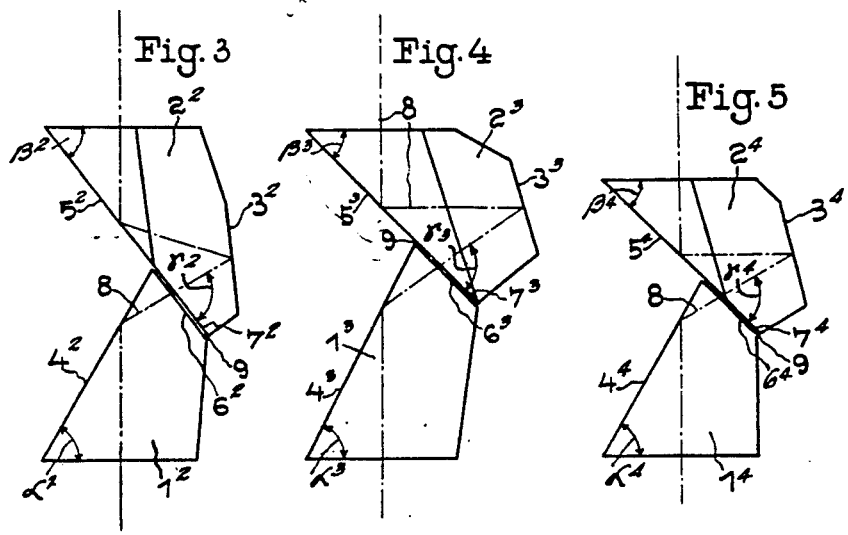
Inventor:
HANS HENSOLDT Patented June 6, 1939

2,161,623

UNITED STATES PATENT OFFICE 2,161,623

PRISM SYSTEM

Hans Hensoldt, Wetzlar, Germany

Application August 25, 1937, Serial No. 160,791
In Germany August 28, 1936

4 Claims. (Cl. 88—1)

Image-reversing prism systems have already been proposed which consist of two single prisms disposed in series in the path of the rays of light, the one of these having a totally reflective surface and the other having two surfaces of this nature, of which the one may be of roof-shaped form.

If the two single prisms are not cemented together, the primary ray always passes through the thin layer of air between the same at an angle of 90°. In this way a lower limit is set in respect of the length of the entire system.

It has also been attempted heretofore to allow the primary ray to traverse the air space between the prisms at an angle other than of 90°, but these methods have resulted in a very considerable displacement of the primary ray, so that a straight-view prism system is not produced.

In contradistinction thereto the invention relates to a straight-view image-reversing prism system comprising two single prisms disposed in series in the path of the rays of light, the one of these having a totally reflective surface and the other having two surfaces of this nature of which the one may be of roof-shaped form, and consists in the fact that the oppositely disposed adjacent plano faces of the two prisms are inclined at an angle which is less than 90° in relation to the direction of transmission of the primary ray. The thin layer of air between these two oppositely disposed plano surfaces in consequence is also inclined at such an angle. The inclination of the primary ray in relation to the intermediate layer of air is larger or smaller in direct ratio coresponding to the refractive index of the glass employed.

When using single prisms composed of different kinds of glass the inlet and outlet faces bounding the intermediate layer of air are inclined independently or in common in relation to the primary ray dependent on the refractive indices of the glasses concerned.

The invention will now be described more fully with reference to the accompanying drawing, in which Figs. 1 and 2 show diagrammatically image-reversing prism systems of the known kind.

Figs. 3, 4 and 5 are also diagrammatical illustrations showing embodiments of the system according to the invention.

Prior art

Heretofore the image-reversing system comprising the prisms 1 and 2 has been furnished with the roof-shaped edge 3 disposed parallel to the main passage of the rays and two reflective faces 4 and 5, the surface 4 being inclined by the angle $\alpha=60°$ and the surface 5 by the angle $\beta=60°$.

In Figure 2 a pair of prisms 1' and 2' are used. The prism 1' has a reflective face 4' and the prism 2' has two reflective faces 5' and 3' respectively. The inner faces 6' and 7' of the two prisms are spaced as in Figure 1 in order to shorten the path of the light within the prisms. The construction of Figure 2 was proposed in which the angle $\alpha'$ is 62.5° and the angle $\beta'$ is 55°. The angle of the primary ray 8 with the parallel faces 6' and 7' is then $\gamma=90°$.

The invention

The same aperture and intensity of the light may be obtained, however, if in accordance with the invention the primary ray 8 does not penetrate vertically the air space 9 disposed between the faces 6 and 7, but forms together with the same an angle of other than 90°, namely less than 90°.

In Figure 3 a pair of prisms $1^2$ and $2^2$ are provided with reflective faces $3^2$, $4^2$ and $5^2$ in a manner corresponding generally with the parts of Figures 1 and 2. The opposite parallel faces $6^2$ and $7^2$ of the prisms define a layer of air 9 through which the primary ray 8 is cast. In Figure 3 the angle $\alpha^2$ is 60°, the angle $\beta^2$ is 52.5° and the angle $\gamma^2$ is 82.5°.

In Figure 4 prisms $1^3$ and $2^3$ have reflecting surfaces $3^3$, $4^3$ and $5^3$ and spaced parallel faces $6^3$ and $7^3$. In the modification of Figure 4 the angle $\alpha^3=62.5°$, the angle $\beta^3=45°$ and the angle $\gamma^3=80°$.

In the modification of Figure 5, prisms $1^4$ and $2^4$ have reflecting faces $3^4$, $4^4$ and $5^4$ and spaced faces $6^4$ and $7^4$ through which the primary ray 8 is cast. In this form of the device the angle $\alpha^4=60°$, the angle $\beta^4=45°$ and the angle $\gamma^4=75°$.

The oblique passage of the primary ray 8 through the thin plano-parallel layer of air 9 does not result in any disadvantages, as the colour dispersion occurring at the one face is compensated by that produced at the other face. On the other hand there is obtained the advantage of deflection of the rays which are reflected within the prisms by air, which rays are accordingly expelled from the actual bundle. The image appears more clear, and the existing differences in the light intensity are better emphasized.

An additional advantage associated with the invention consists in the fact that with the same width of the pair of prisms the length of the system is considerably smaller. In this way there is not only obtained a saving in weight, but there is also the possibility of employing objectives of lower power, for example of more than 1:3, without a glass equipped with this system being in any way weaker as compared with the known glasses. When employing objectives of the same power as hitherto usual the light transmitted by the prism system is greater.

The limit of inclination of the primary ray 8 in relation to the layer of air 9 can be selected as desired within certain limits. The angle of incidence at the layer of air 9, however, should not be greater than one-half of the angle of incidence formed by the primary ray 8 with the reflective face 5. For example, the form of prism shown in Fig. 5 is still capable of being employed if a glass is used having a sufficiently high index of refraction.

According to the invention, the inclination of the primary ray 8 is larger or smaller in direct ratio dependent on the refractive index of the glass employed.

If single prisms are used which are made of different kinds of glass, the inlet and outlet faces 6 and 7 bounding the air space 9 are inclined in relation to the primary ray 8 either singly or in common dependent on the refractive indices of the different glasses. With a system of this nature it is possible to obtain a perfectly straight line of vision without the occurrence of interfering colour effects. The two prisms then represent together an achromatic system.

The reflecting surfaces 3², 3³ and 3⁴ are disposed with respect to the entering face of the prism 1 greater than a right angle. The result of this is that the primary ray 8 is cast through the air space 9 at an angle less than 90°. The exact angle which the reflecting surfaces 3² and 3³ or 3⁴ makes with the entering face is subject to variation and will cause a variation in the size of the angle γ. Thus, the face 3² is already slightly more than 90° displaced from the entering face. The face 3³ is rotated by a greater amount and the face 3⁴ lies at an angle intermediate of the faces 3² and 3³.

What I claim as new and desire to secure by Letters Patent is:

1. In a prism system, a prism having an entrance plano face perpendicular to the entering path of the ray of light, an exit plano face inclined to said entrance face and a single totally reflective face joining the upper end of the inclined face and one end of the entrance face, a second prism arranged in series with the first prism and having an inclined plano entrance face parallel with the inclined plano exit face of the first prism forming a plano layer of air therebetween, and having a continuing portion extending free of the exit face of the first prism and acting as a reflector, said second prism having an exit face at an acute angle with said inclined face extension, said last named exit face being parallel with the entrance face of the first prism, and perpendicular to the path of the ray of light passing through said exit face, the exit ray being on the line on the entrance ray, and said second prism having an inclined roof-shaped face acting as a reflector, whereby the entering ray is totally reflected once in the first prism and twice in the second prism, and the entering vision reversed in the same line of the path of the entering ray of light, the combination therewith of the disposition of the angular positions of the reflecting face of the first prism, and of the roof reflecting face of the second prism, in respect to the layer of air faces inclined to both the last named faces, so that the ray of reflected light from the first prism on passing through the exit face of the first prism and entering unreflected thereby through the adjacent entrance face of the second prism and likewise through the layer of air, meets the roof face at such an angle that said straight ray makes an angle of less than 90° with said plano parallel surfaces and with the plano layer of air therebetween, whereby the prism system is shortened and of less weight than those used heretofore.

2. In a prism system, a prism having an entrance plano face perpendicular to the entering path of the ray of light, an exit plano face inclined to said entrance face and a single totally reflective face joining the upper end of the inclined face and one end of the entrance face, a second prism arranged in series with the first prism and having an inclined plano entrance face parallel with the inclined plano exit face of the first prism forming a plano layer of air therebetween, and having a continuing portion extending free of the exit face of the first prism and acting as a reflector, said second prism having an exit face at an acute angle with said inclined face extension, said last named exit face being parallel with the entrance face of the first prism, and perpendicular to the path of the ray of light passing through said exit face, the exit ray being on the line of the entrance ray, and said second prism having an inclined roof-shaped face acting as a reflector, whereby the entering ray is totally reflected once in the first prism and twice in the second prism, and the entering vision reversed in the same line of the path of the entering ray of light, the combination therewith of the disposition of the angular positions of the reflecting face of the first prism, and of the roof reflecting face of the second prism, in respect to the layer of air faces inclined to both the last named faces, so that the ray of reflected light from the first prism on passing through the exit face of the first prism and entering unreflected thereby through the adjacent entrance face of the second prism and likewise through the layer of air, meets the roof face at such an angle that said straight ray makes an angle of less than 90° with said plano parallel surfaces and with the plano layer of air therebetween, the inclination of the primary ray in relation to the said layer of air varying in direct ratio dependent upon the refractive index of the glass of the prisms, whereby the prism system is shortened and of less weight than those used heretofore.

3. In a prism system, a prism having an entrance plano face perpendicular to the entering path of the ray of light, an exit plano face inclined to said entrance face and a single totally reflective face joining the upper end of the inclined face and one end of the entrance face, a second prism arranged in series with the first prism and having an inclined plano entrance face parallel with the inclined plano exit face of the first prism forming a plano layer of air therebetween, and having a continuing portion extending free of the exit face of the first prism and acting as a reflector, said second prism having an exit face at an acute angle with said inclined face extension, said last named exit face being parallel with the entrance face of the first prism, and perpendicular to the path of the ray of light passing through said exit face, the exit ray being on the line of the entrance ray, and said second prism having an inclined roof-shaped face acting as a reflector, whereby the entering ray is totally reflected once in the first prism and twice in the second prism, and the entering vision reversed in the same line of the path of the entering ray of light, the combination therewith of the disposition of the angular positions of the reflecting face of the first prism, and of the roof reflecting face of the second prism, in respect to the layer of air faces inclined to both the last named faces, so that the ray of reflected light from the first prism on passing through the exit face of the first prism and entering unreflected thereby through the adjacent entrance face of the second prism and likewise through the layer of air, meets the roof face at such an angle that said straight ray makes an angle of less than 90° with said plano parallel surfaces and with the plano layer of air therebetween, the angle of inclination of the oppositely disposed faces in relation to the ray varying according to the refraction indices of the different glasses, whereby the prism system is shortened and of less weight than those used heretofore.

4. In a prism system, a prism having an entrance plano face perpendicular to the entering path of the ray of light, an exit plano face inclined to said entrance face and a single totally reflective face joining the upper end of the inclined face and one end of the entrance face, a second prism arranged in series with the first prism and having an inclined plano entrance face parallel with the inclined plano exit face of the first prism forming a plano layer of air therebetween, and having a continuing portion extending free of the exit face of the first prism and acting as a reflector, said second prism having an exit face at an acute angle with said inclined face extension, said last named exit face being parallel with the entrance face of the first prism, and perpendicular to the path of the ray of light passing through said exit face, the exit ray being on the line of the entrance ray, and said second prism having an inclined roof-shaped face acting as a reflector, whereby the entering ray is totally reflected once in the first prism and twice in the second prism, and the entering vision reversed in the same line of the path of the entering ray of light, the combination therewith of the disposition of the angular positions of the reflecting face of the first prism, and of the roof reflecting face of the second prism, in respect to the layer of air faces inclined to both the last named faces, so that the ray of reflected light from the first prism on passing through the exit face of the first prism and entering unreflected thereby through the adjacent entrance face of the second prism and likewise through the layer of air, meets the roof face at such an angle that said straight ray makes an angle of less than 90° with said plano parallel surfaces and with the plano layer of air therebetween, and the said oppositely disposed faces and the layer of air being disposed at an angle of more than 75° and less than 90° in relation to the direction of transmission of the ray, whereby the prism system is shortened and of less weight than those used heretofore.

HANS HENSOLDT.